May 15, 1956 W. W. CRUCE 2,745,218
FLOWER HOLDER
Filed May 28, 1954

INVENTOR.
Woodrow W. Cruce
BY
ATTORNEY.

United States Patent Office 2,745,218
Patented May 15, 1956

2,745,218

FLOWER HOLDER

Woodrow W. Cruce, Miami, Okla.

Application May 28, 1954, Serial No. 432,975

1 Claim. (Cl. 47—41)

This invention relates to floral arrangements and particularly to a novel holder for receiving and supporting the stems of the individual flowers of an arrangement.

The most important object of the present invention is the provision of a pierceable member on the holder, which member is adapted to receive the stems of the individual flowers and to permit removal therefrom of the stems when the flowers are no longer in condition for display.

A further important object of the present invention is the provision of a portable flower holder having a bail thereon for carrying the holder to and from a point of display.

With these and other objects in view, the flower holder of the present invention comprises generally a base; a pierceable, stem-receiving member superimposed on the base; and a bail mounted on the base in bridging relation to the base and the member.

Other objectives of the present invention include the use of water absorptive material in the above mentioned pierceable member; the provision of anchoring elements for the holder; and other, more minor objects which will become apparent in the following specification and from a study of the appended drawing, wherein.

Figure 1:
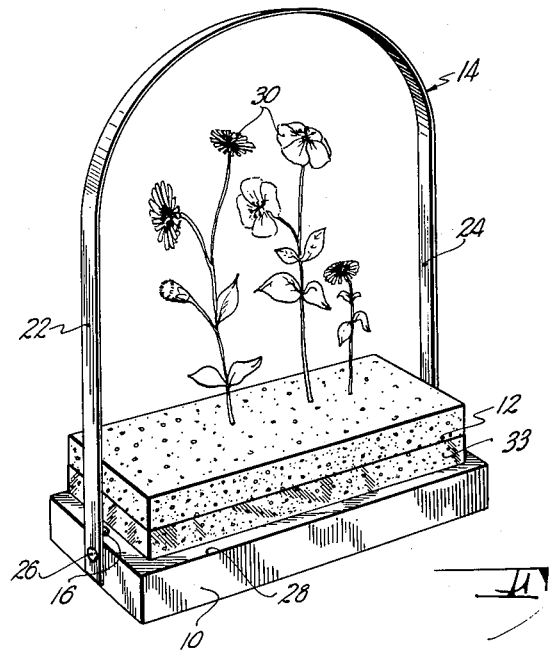
Figure 1 is a perspective view of a flower holder made in accordance with the present invention.

Referring now to the drawing, the embodiment of the present invention chosen for illustration includes, generally, a base 10, a stem-receiving member 12 and a bail 14.

The base 10 is a polygonal block of wood or other suitable material, and is provided with perforations 16. The peforations 16 are adapted to receive anchoring elements 18, by means of which the flower holder may be releasably secured to a support 20.

As illustrated in Fig. 1, the carrying bail 14 is arched or U-shaped in configuration and has a pair of legs 22 and 24 which are secured to opposed, side edges of the base 10 by fasteners 26. In this manner, the bail 14 extends from side to side of the base 10, in bridging relationhip thereto and to the member 12.

Figures 2, 3:
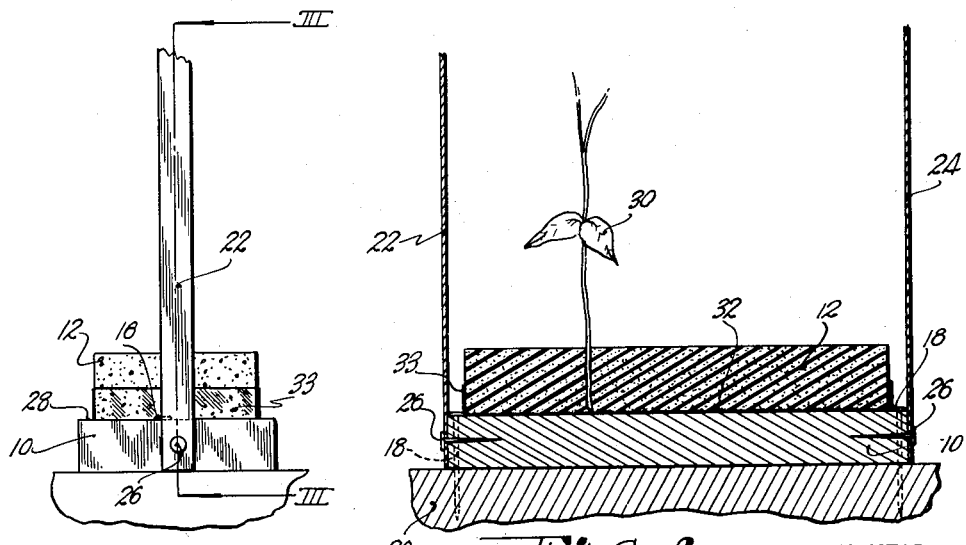
Fig. 2 is a fragmentary, side, elevational view of the flower holder of Fig. 1.
Fig. 3 is a cross-section taken on line III—III of Fig. 2.

The stem-receiving member 12 takes the shape of a polygonal block of porous, plastic foam having the lower, marginal edges thereof within the boundary of the top surface 28 of base 10. The block 12 illustrated in the drawing is made of such a plastic foam, namely, expanded polystyrene, but manifestly may be of any suitable, pierceable material. Preferably, the material chosen for block 12 should be water absorptive if the flowers 30 of a floral arrangement thereon are to remain in a condition suitable for display over an extended period of time. As illustrated in Fig. 3, the block member 12 is secured to the base 10 by means of a waterproof film 32 of any suitable adhesive substance which film 32 extends upwardly along the side edges of member 12, as indicated by the numeral 33 in Figs. 1–3. Thus, the film 32—33 presents a waterproof tray between presents a waterproof tray between the member 12 and the base 10.

Thus, a holder has been provided on which the individual flowers 30 may be arranged to suit the taste of the arranger. By means of the bail 14, the flower holder of the present invention may be carried from a point of arrangement to a point of display, where the holder may then be temporarily held in place on a support 20 by means of anchoring elements 18. There, water may be added to the block member 12 as necessary to prolong the life of the flowers 30. When the floral arrangement is no longer suitable for display, the entire holder may be removed from the support 20. Thereupon, the flowers 30 may be removed and replaced, and the flower holder of the present invention reused indefinitely.

It is obvious that the embodiment herein disclosed is a preferred form only and that many changes or modifications may be made therein without departing from the broad principles of the present invention. Such changes or modifications are contemplated hereby and it is, therefore, desired to be limited only by the scope of the appended claim.

Having thus described the invention, what is claimed as new and desired to be secured by Letters Patent is:

A holder of the kind described, comprising, in combination, a solid base plate having an uppermost flat surface; a porous, water absorptive, pierceable block atop the base and having a lowermost flat face and upright, marginal, side edges; and a continuous, waterproof, adhesive film on the block covering said lowermost face and at least a lower portion of all of said marginal edges of the block, said film extending between the block and the base and in engagement with both for mounting the block on the base.

References Cited in the file of this patent

UNITED STATES PATENTS

| 1,300,775 | Reed | April 15, 1919 |
| 2,057,537 | Oshiro | Oct. 13, 1936 |
| 2,366,377 | Zois | Jan. 2, 1945 |
| 2,618,901 | Braun | Nov. 25, 1952 |

FOREIGN PATENTS

| 745,106 | France | Feb. 7, 1933 |